(12) United States Patent
Hetang et al.

(10) Patent No.: US 12,741,664 B2
(45) Date of Patent: Sep. 22, 2026

(54) IMPLEMENTING SYNTHETIC SCENES FOR AUTONOMOUS VEHICLES

(71) Applicant: Waymo LLC, Mountain View, CA (US)

(72) Inventors: Congrui Hetang, Mountain View, CA (US); Yi Shen, Sunnyvale, CA (US); Youjie Zhou, Sunnyvale, CA (US); Jiyang Gao, Foster City, CA (US)

(73) Assignee: Waymo LLC

( * ) Notice: Subject to any disclaimer, the term of this patent is extended or adjusted under 35 U.S.C. 154(b) by 669 days.

(21) Appl. No.: 17/349,489

(22) Filed: Jun. 16, 2021

(65) Prior Publication Data

US 2022/0402520 A1 Dec. 22, 2022

(51) Int. Cl.

| | |
|---|---|
| ***B60W 60/00*** | (2020.01) |
| ***G01C 21/00*** | (2006.01) |
| ***G01C 21/34*** | (2006.01) |
| ***G01C 21/36*** | (2006.01) |
| ***G06N 20/00*** | (2019.01) |

(52) U.S. Cl.

CPC ....... *B60W 60/001* (2020.02); *G01C 21/3407* (2013.01); *G01C 21/3602* (2013.01); *G01C 21/3819* (2020.08); *G06N 20/00* (2019.01); *B60W 2552/00* (2020.02); *B60W 2554/4029* (2020.02)

(58) Field of Classification Search

CPC ........... B60W 60/001; B60W 2552/00; B60W 2554/4029; B60W 30/09; B60W 30/0956; B60W 50/00; B60W 2050/0005; G01C 21/3407; G01C 21/3602; G01C 21/3819; G01C 21/3461; G06N 20/00; G06V 20/58; G06V 20/582; G06V 20/588

See application file for complete search history.

(56) References Cited

U.S. PATENT DOCUMENTS

| | | | |
|---|---|---|---|
| 10,379,538 | B1 | 8/2019 | Sheckells et al. |
| 10,671,075 | B1 | 6/2020 | Kobilarov |
| 10,933,869 | B2 | 3/2021 | Gochev et al. |
| 11,003,183 | B2 | 5/2021 | Zhu |
| 11,034,364 | B1 | 6/2021 | Narang et al. |

(Continued)

FOREIGN PATENT DOCUMENTS

| | | | |
|---|---|---|---|
| EP | 3723001 | A1 | 10/2020 |
| WO | 2021016116 | A1 | 1/2021 |

OTHER PUBLICATIONS

The extended European search report for EP Application No. 22179405.0, mailed Nov. 22, 2022, 8 pages.

(Continued)

*Primary Examiner* — David P. Merlino

(74) *Attorney, Agent, or Firm* — Van Hoven PC; Jordan Becker

(57) ABSTRACT

A system includes a memory device, and a processing device, operatively coupled to the memory device, to receive a set of input data including a roadgraph, the roadgraph including an autonomous vehicle driving path, modify the roadgraph to obtain a modified roadgraph by adjusting a trajectory of the autonomous vehicle driving path, place a set of artifacts along one or more lane boundaries of the modified roadgraph to generate a synthetic scene, and train a machine learning model used to navigate an autonomous vehicle based on the synthetic scene.

20 Claims, 10 Drawing Sheets

(56) References Cited

U.S. PATENT DOCUMENTS

| | | | |
|---|---|---|---|
| 11,560,154 B1 | 1/2023 | Gate et al. | |
| 11,731,612 B2 | 8/2023 | Zhou et al. | |
| 11,891,087 B2 | 2/2024 | Marchetti-Bowick et al. | |
| 11,891,088 B1 * | 2/2024 | Kobilarov | G07C 5/0808 |
| 11,922,642 B1 | 3/2024 | Setzer et al. | |
| 12,013,256 B1 | 6/2024 | Kaplan et al. | |
| 12,103,554 B2 | 10/2024 | Urtasun et al. | |
| 12,459,539 B1 | 11/2025 | Nag et al. | |
| 2015/0353082 A1 | 12/2015 | Lee et al. | |
| 2015/0353085 A1 | 12/2015 | Lee | |
| 2016/0375901 A1 | 12/2016 | Di Cairano et al. | |
| 2017/0202131 A1 | 7/2017 | Bunderson et al. | |
| 2017/0357262 A1 | 12/2017 | Dix et al. | |
| 2018/0011494 A1 | 1/2018 | Zhu et al. | |
| 2018/0162412 A1 | 6/2018 | Gao et al. | |
| 2018/0188043 A1 | 7/2018 | Chen et al. | |
| 2018/0203445 A1 | 7/2018 | Micks et al. | |
| 2018/0284769 A1 | 10/2018 | Wang et al. | |
| 2019/0079514 A1 | 3/2019 | Zhu | |
| 2019/0079523 A1 | 3/2019 | Zhu et al. | |
| 2019/0079528 A1 | 3/2019 | Zhu et al. | |
| 2019/0080266 A1 | 3/2019 | Zhu et al. | |
| 2019/0086925 A1 | 3/2019 | Fan et al. | |
| 2019/0086930 A1 | 3/2019 | Fan et al. | |
| 2019/0086932 A1 | 3/2019 | Fan et al. | |
| 2019/0113927 A1 | 4/2019 | Englard et al. | |
| 2019/0146500 A1 | 5/2019 | Yalla et al. | |
| 2019/0147255 A1 | 5/2019 | Homayounfar et al. | |
| 2019/0228571 A1 * | 7/2019 | Atsmon | G01C 21/3815 |
| 2019/0235506 A1 | 8/2019 | Bardapurkar et al. | |
| 2019/0303759 A1 * | 10/2019 | Farabet | G06F 9/455 |
| 2019/0310644 A1 | 10/2019 | Zhang | |
| 2019/0315357 A1 | 10/2019 | Zhang et al. | |
| 2019/0361432 A1 | 11/2019 | Levinson et al. | |
| 2019/0384304 A1 * | 12/2019 | Towal | G06N 3/08 |
| 2020/0074266 A1 | 3/2020 | Peake et al. | |
| 2020/0191586 A1 | 6/2020 | Luo | |
| 2020/0191979 A1 | 6/2020 | Lindskog | |
| 2020/0192389 A1 * | 6/2020 | ReMine | G05D 1/0221 |
| 2020/0209864 A1 | 7/2020 | Chen | |
| 2020/0211370 A1 | 7/2020 | Chen | |
| 2020/0218261 A1 | 7/2020 | Zidek | |
| 2020/0301799 A1 * | 9/2020 | Manivasagam | G06T 17/20 |
| 2020/0310446 A1 | 10/2020 | Zhu | |
| 2020/0341466 A1 | 10/2020 | Pham et al. | |
| 2020/0356828 A1 | 11/2020 | Palanisamy et al. | |
| 2021/0004017 A1 * | 1/2021 | Colgate | G01C 21/3833 |
| 2021/0020045 A1 | 1/2021 | Huang et al. | |
| 2021/0061307 A1 | 3/2021 | Connell et al. | |
| 2021/0080955 A1 | 3/2021 | Wilkinson et al. | |
| 2021/0181740 A1 | 6/2021 | Zhu | |
| 2021/0241614 A1 | 8/2021 | Mubarek et al. | |
| 2021/0309248 A1 * | 10/2021 | Choe | G06N 3/04 |
| 2021/0325891 A1 | 10/2021 | Young et al. | |
| 2021/0347382 A1 | 11/2021 | Huang et al. | |
| 2021/0370980 A1 | 12/2021 | Ramamoorthy et al. | |
| 2021/0373566 A1 | 12/2021 | Agarwal et al. | |
| 2022/0157161 A1 | 5/2022 | Tan et al. | |
| 2022/0219730 A1 | 7/2022 | Song et al. | |
| 2022/0261519 A1 | 8/2022 | Muehlenstaedt et al. | |
| 2022/0332336 A1 * | 10/2022 | Weaver | B60W 60/001 |
| 2022/0349725 A1 | 11/2022 | Chreptyk et al. | |
| 2022/0391766 A1 | 12/2022 | Acuna Marrero et al. | |
| 2023/0021034 A1 | 1/2023 | Cui et al. | |
| 2023/0027496 A1 | 1/2023 | Rajakumar et al. | |
| 2023/0038842 A1 | 2/2023 | Yu et al. | |
| 2023/0252624 A1 * | 8/2023 | Sergeev | A01G 7/00 382/128 |
| 2023/0415772 A1 | 12/2023 | Wolff et al. | |
| 2024/0001957 A1 | 1/2024 | Choe et al. | |
| 2024/0001963 A1 | 1/2024 | Kinakar et al. | |
| 2024/0017747 A1 * | 1/2024 | Hasenklever | B60W 60/00274 |
| 2024/0061307 A1 | 2/2024 | Yafuso et al. | |
| 2024/0092357 A1 | 3/2024 | Kobilarov et al. | |
| 2024/0288274 A1 | 8/2024 | Zhou et al. | |
| 2024/0290143 A1 | 8/2024 | Famiglietti et al. | |
| 2024/0391495 A1 | 11/2024 | Nister | |

OTHER PUBLICATIONS

The extended European search report for EP Application No. 22179410.0, mailed Nov. 23, 2022, 8 pages.

Nividia: "Nividia Drive Sim", Youtube, Jan. 8, 2019 (Jan. 8, 2019), p. 1 pp., XP054981495, Retrieved from the Internet: URL:https://www.youtube.com/watch?v=DXsLDyiONV4, [retrieved on Mar. 8, 2021].

Cazenave T., et al., "Monte Carlo Vehicle Routing," CEUR-WS,2020, vol. 2701, pp. 1-8.

Cobano J.A., et al., "Path planning based on Genetic Algorithm and the Monte-Carlo method to avoid aerial vehicle collision under uncertainties," IEEE, 2011, pp. 4429-4434.

Chenjing J., et al., "A Fast and Effective Deep Learning Approach for Road Extraction from Historical Maps by Automatically Generating Training Data with Symbol Reconstruction", Aug. 22, 2022, International Journal of Applied Earth Observations and Geoinformation, pp. 1-12 Pages.

David Yu., "Road Feature Detection & Geo Tagging with Deep Learning", Medium.com, Jun. 6, 2019, pp. 1-50.

Goodman N., "Uber AI Labs Open Sources Pyro, a Depp Probabilistic Programming Language", Uber Blog, Nov. 2017, pp. 1-10.

Inkyung S., et al., On the Training of a Neural Network for Online Path Planning with Offline Path Planning Algorithms, Jun. 2020, International Journal of Information Management, pp. 1-9.

Kabkab M., et al., "Dcnns on a Diet: Sampling Strategies for Reducing the Training Set Size", Arxiv, Jun. 14, 2016, pp. 1-14.

Mariusz B., et al., "End-to-end Deep Learning for Self-driving Cars", Nvidia Corp, Aug. 17, 2016, pp. 1-9.

Ivan S., et al., "Traffic Scene Classification on a Representation Budget," IEEE Transactions on Intelligent Transportation Systems, Jan. 2020, vol. 21(1), pp. 1-10.

* cited by examiner

600

IMPLEMENTING SYNTHETIC SCENES FOR AUTONOMOUS VEHICLES

TECHNICAL FIELD

The instant specification generally relates to autonomous vehicles. More specifically, the instant specification relates to implementing synthetic scenes for autonomous vehicles.

BACKGROUND

An autonomous (fully and partially self-driving) vehicle (AV) operates by sensing an outside environment with various electromagnetic (e.g., radar and optical) and non-electromagnetic (e.g., audio and humidity) sensors. Some autonomous vehicles chart a driving path through the environment based on the sensed data. The driving path can be determined based on Global Positioning System (GPS) data and road map data. While the GPS and the road map data can provide information about static aspects of the environment (buildings, street layouts, road closures, etc.), dynamic information (such as information about other vehicles, pedestrians, streetlights, etc.) is obtained from contemporaneously collected sensing data. Precision and safety of the driving path and of the speed regime selected by the autonomous vehicle depend on timely and accurate identification of various objects present in the driving environment and on the ability of a driving algorithm to process the information about the environment and to provide correct instructions to the vehicle controls and the drivetrain.

SUMMARY

In one implementation, disclosed is a system including a memory device and a processing device operatively coupled to the memory device. The processing device is to receive a set of input data including a roadgraph. The roadgraph includes an autonomous vehicle driving path. The processing device is further to modify the roadgraph to obtain a modified roadgraph by adjusting a trajectory of the autonomous vehicle driving path, place a set of artifacts along one or more lane boundaries of the modified roadgraph to generate a synthetic scene, and train a machine learning model used to navigate an autonomous vehicle based on the synthetic scene.

In another implementation, disclosed is a method. The method includes receiving, by a processing device, a set of input data including a roadgraph. The roadgraph includes an autonomous vehicle driving path. The method further includes modifying, by the processing device, the roadgraph to obtain a modified roadgraph. Modifying the roadgraph includes adjusting a trajectory of the autonomous vehicle driving path. The method further includes, placing, by the processing device, a set of artifacts along one or more lane boundaries of the modified roadgraph to generate a synthetic scene, and training, by the processing device a machine learning model used to navigate an autonomous vehicle based on the synthetic scene.

In yet another implementation, disclosed is a non-transitory computer-readable storage medium having instructions stored thereon that, when executed by a processing device, cause the processing device to obtain a trained machine learning model used to navigate an autonomous vehicle. The trained machine learning model is trained based on a synthetic scene including a modified roadgraph having a modified autonomous vehicle driving path and a set of synthetic artifacts along at least one lane boundary within the modified roadgraph. The non-transitory computer-readable storage medium has further instructions stored thereon that, when executed by the processing device, cause the processing device to receive detection results including a set of artifacts within a scene while the autonomous vehicle is proceeding along a driving path, and cause a modification of the driving path using the machine learning model in view of the detection results.

BRIEF DESCRIPTION OF THE DRAWINGS

The disclosure is illustrated by way of examples, and not by way of limitation, and can be more fully understood with references to the following detailed description when considered in connection with the figures, in which.

DETAILED DESCRIPTION

Figure 1:
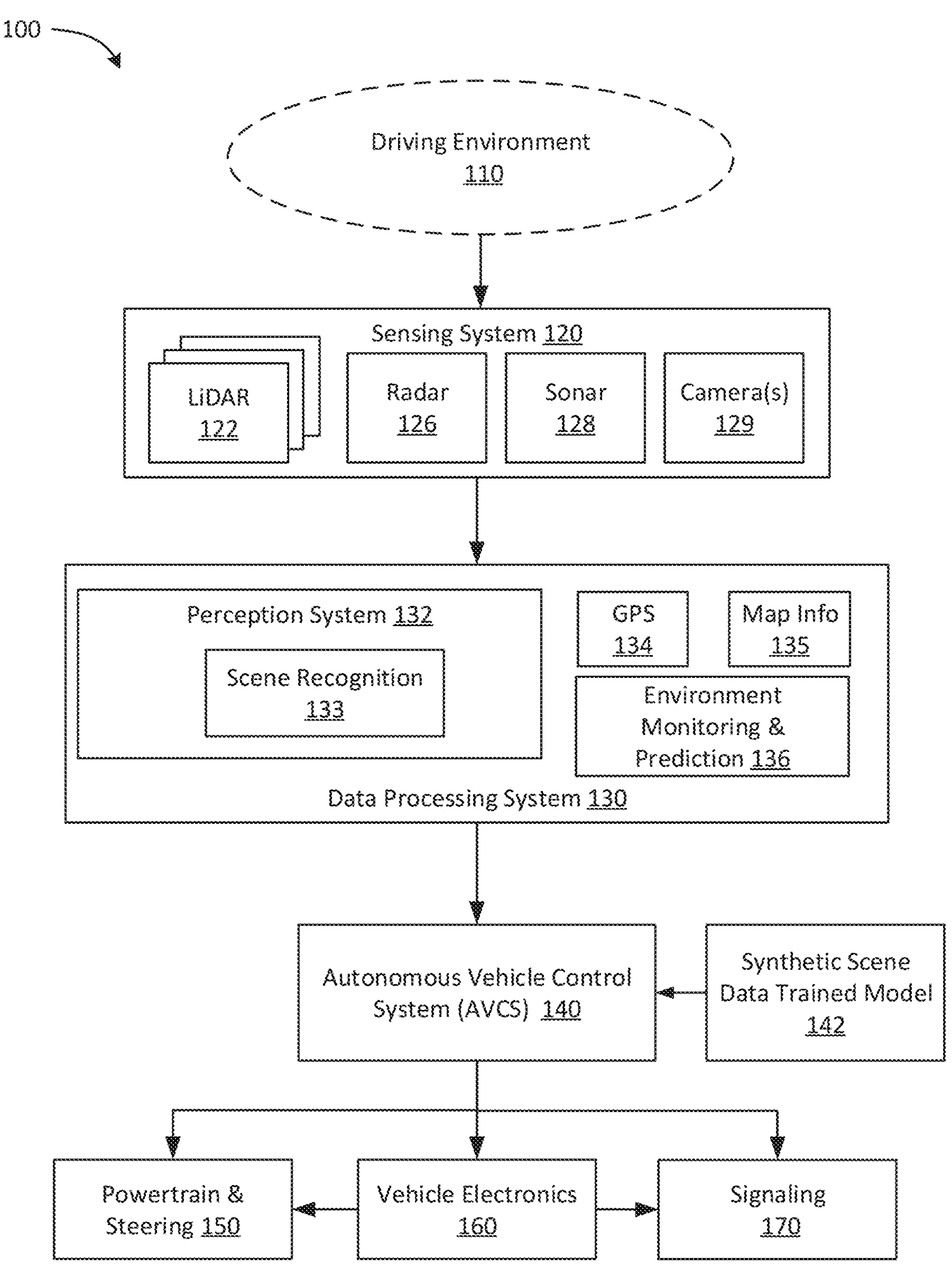
FIG. 1 is a diagram illustrating components of an example autonomous vehicle capable of implementing synthetic scenes, in accordance with some implementations of the present disclosure.

A vehicle travels a route from a starting location to a destination location. Routes include segments that have different elevations and grades (e.g., pitches, uphill sections, downhill sections) of different lengths. Routes also include segments that have different radius of curvature (e.g., winding roads of different lengths and grades). Some route segments are associated with historical data, such as historically windy segments, historically high-traffic segments, historically recommended lanes in segments, etc.

An autonomous vehicle (AV) performs vehicle actions, such as braking, steering, and throttling, to move the AV from the starting location to the destination location along the route. The AV has a planning module that receives route data (e.g., from a server) that includes particular roads to travel from the starting location to the destination location. The planning module (also referred to herein as a "routing module") receives sensor data from the perception system (e.g., vehicle sensors) that indicates locations of other objects. The routing module uses the sensor data and the route data to generate short time horizon routing data. The short time horizon routing data includes instructions of how to control the AV over a short interval of time (e.g., the next 10 seconds). The short time horizon routing data may be generated (e.g., regenerated, refreshed) very frequently (e.g., every 100 milliseconds (ms)). By being generated very frequently, the short time horizon routing data can reflect changes in the vehicle or the world (e.g., engine degradation, other objects changing course or speed or appearing suddenly). The routing module provides the short time horizon routing data to a motion control module. The motion control module controls the vehicle systems over the next interval of time (e.g., the next 10 seconds, next 100 ms) based on the short time horizon plan data (e.g., and the refreshed or regenerated short time horizon plan). The routing module continues generating (e.g., refreshing) new short time horizon routing data for the subsequent intervals of time based on the route data and the current sensor data from the perception system. The motion control module continues controlling the vehicle based on the new short time horizon plan data.

Construction zones are one type of scene that AV's presently struggle to address. Machine learning models for construction zone understanding with respect to AV's can require a large amount of construction zone data with ground-truth annotations (e.g., labels) of how to navigate inside of construction zones. Conventionally, construction zone data is collected from real-world scenarios ("real construction zone data") and some real construction zone data can be labeled by humans for pair-wise construction cone connectivity. Although such real construction zone data can have high fidelity, it can also suffer from limited data scale and diversity. The natural scarcity of real construction zone data relative to overall distance driven limits the amount of real-world data available, regardless of distance driven. Additionally, the manual labeling of construction zones can be non-trivial and/or expensive. Accordingly, it is difficult to effectively train machine learning models for AV construction zone understanding using real-world construction zone data.

Aspects of the disclosure address the above challenges, along with others, by generating synthetic construction zone data for training machine learning models for construction zone understanding. For example, compared to real-world construction zone data, synthetic construction zone data generated in accordance with the implementations described herein can improve the ability of a computer system to generate large amounts of ground-truth annotated data, and improve the ability to perform targeted generation of desired construction zone cases.

The synthetic construction zone data described herein can be generated to include a construction zone "roadgraph," which is a polyline graph representing drivable paths or lanes that evade a synthetic construction zone, and object configurations of objects or artifacts, such as synthetic cones, construction vehicles, construction signs, direction signs, speed limit signs, roadblocks, etc., that define a layout of the synthetic construction zone. The layout of the construction zone can include positions of construction cones, vehicles, construction workers, etc. For example, an object configuration can include artifacts (e.g., cones) defining a boundary of the synthetic construction zone in view of the paths in the roadgraph. The synthetic construction zone data can be generated with controllable appearance (e.g., user-controlled) with sufficient variance.

The synthetic construction zone data described herein can be used in a variety of practical use cases for training machine learning models for construction zone understanding without requiring "real" labeled data. Examples of such use cases include (1) ramping up machine learning models while a manual-labeling pipeline is under development; (2) generating configurable test cases; and (3) training machine learning models jointly with "real" labeled data (e.g., augment "real" labeled data).

Aspects and implementations disclosed herein provide numerous advantages over existing technologies. For example, generating synthetic construction zone data can increase scale and diversity that can be used to effectively train machine learning models for autonomous vehicle operations. Additionally, the synthetic construction zone data can be generated to be configurable for construction zone test cases. Use cases for the synthetic scene data include, but are not limited to, ramping up machine learning models, generating fully-controllable test cases, training a machine learning model jointly with manually-labeled data, and performing targeted augmentation for long-tail cases.

FIG. 1 is a diagram illustrating components of an example autonomous vehicle (AV) 100 capable of using motion patterns for object classification and tracking, in accordance with some implementations of the present disclosure. FIG. 1 illustrates operations of the example autonomous vehicle. Autonomous vehicles can include motor vehicles (cars, trucks, buses, motorcycles, all-terrain vehicles, recreational vehicle, any specialized farming or construction vehicles, and the like), aircraft (planes, helicopters, drones, and the like), naval vehicles (ships, boats, yachts, submarines, and the like), or any other self-propelled vehicles (e.g., sidewalk delivery robotic vehicles) capable of being operated in a self-driving mode (without a human input or with a reduced human input).

A driving environment 110 can include any objects (animated or non-animated) located outside the AV, such as roadways, buildings, trees, bushes, sidewalks, bridges, mountains, other vehicles, pedestrians, and so on. The driving environment 110 can be urban, suburban, rural, and so on. In some implementations, the driving environment 110 can be an off-road environment (e.g. farming or agricultural land). In some implementations, the driving environment can be an indoor environment, e.g., the environment of an industrial plant, a shipping warehouse, a hazardous area of a building, and so on. In some implementations, the driving environment 110 can be substantially flat, with various objects moving parallel to a surface (e.g., parallel to the surface of Earth). In other implementations, the driving environment can be three-dimensional and can include objects that are capable of moving along all three directions (e.g., balloons, leaves, etc.). Hereinafter, the term "driving environment" should be understood to include all environments in which an autonomous motion of self-propelled vehicles can occur. For example, "driving environment" can include any possible flying environment of an aircraft or a marine environment of a naval vessel. The objects of the driving environment 110 can be located at any distance from the AV, from close distances of several feet (or less) to several miles (or more).

The example AV 100 can include a sensing system 120. The sensing system 120 can include various electromagnetic (e.g., optical) and non-electromagnetic (e.g., acoustic) sensing subsystems and/or devices. The terms "optical" and "light," as referenced throughout this disclosure, are to be understood to encompass any electromagnetic radiation (waves) that can be used in object sensing to facilitate autonomous driving, e.g., distance sensing, velocity sensing, acceleration sensing, rotational motion sensing, and so on. For example, "optical" sensing can utilize a range of light visible to a human eye (e.g., the 380 to 700 nm wavelength range), the ultraviolet range (below 380 nm), the infrared range (above 700 nm), the radio frequency range (above 1 m), etc. In implementations, "optical" and "light" can include any other suitable range of the electromagnetic spectrum.

The sensing system 120 can include a radar unit 126, which can be any system that utilizes radio or microwave frequency signals to sense objects within the driving environment 110 of the AV 100. The radar unit can be configured to sense both the spatial locations of the objects (including their spatial dimensions) and their velocities (e.g., using the Doppler shift technology). Hereinafter, "velocity" refers to both how fast the object is moving (the speed of the object) as well as the direction of the object's motion.

The sensing system 120 can include one or more lidar sensors 122 (e.g., lidar rangefinders), which can be a laser-based unit capable of determining distances (e.g., using ToF technology) to the objects in the driving environment 110. The lidar sensor(s) can utilize wavelengths of electromagnetic waves that are shorter than the wavelength of the radio waves and can, therefore, provide a higher spatial resolution and sensitivity compared with the radar unit. The lidar sensor(s) can include a coherent lidar sensor, such as a frequency-modulated continuous-wave (FMCW) lidar sensor. The lidar sensor(s) can use optical heterodyne detection for velocity determination. In some implementations, the functionality of a ToF and coherent lidar sensor(s) is combined into a single (e.g., hybrid) unit capable of determining both the distance to and the radial velocity of the reflecting object. Such a hybrid unit can be configured to operate in an incoherent sensing mode (ToF mode) and/or a coherent sensing mode (e.g., a mode that uses heterodyne detection) or both modes at the same time. In some implementations, multiple lidar sensor(s) 122 units can be mounted on AV, e.g., at different locations separated in space, to provide additional information about a transverse component of the velocity of the reflecting object, as described in more detail below.

The lidar sensor(s) 122 can include one or more laser sources producing and emitting signals and one or more detectors of the signals reflected back from the objects. The lidar sensor(s) 122 can include spectral filters to filter out spurious electromagnetic waves having wavelengths (frequencies) that are different from the wavelengths (frequencies) of the emitted signals. In some implementations, the lidar sensor(s) 122 can include directional filters (e.g., apertures, diffraction gratings, and so on) to filter out electromagnetic waves that can arrive at the detectors along directions different from the retro-reflection directions for the emitted signals. The lidar sensor(s) 122 can use various other optical components (lenses, mirrors, gratings, optical films, interferometers, spectrometers, local oscillators, and the like) to enhance sensing capabilities of the sensors.

In some implementations, the lidar sensor(s) 122 can scan 360-degree in a horizontal direction. In some implementations, the lidar sensor(s) 122 can be capable of spatial scanning along both the horizontal and vertical directions. In some implementations, the field of view can be up to 90 degrees in the vertical direction (e.g., with at least a part of the region above the horizon being scanned by the lidar signals). In some implementations, the field of view can be a full sphere (consisting of two hemispheres). For brevity and conciseness, when a reference to "lidar technology," "lidar sensing," "lidar data," and "lidar," in general, is made in the present disclosure, such reference shall be understood also to encompass other sensing technology that operate at generally in the near-infrared wavelength, but may include sensing technology that operate at other wavelengths.

The sensing system 120 can further include one or more cameras 129 to capture images of the driving environment 110. The images can be two-dimensional projections of the driving environment 110 (or parts of the driving environment 110) onto a projecting plane (flat or non-flat, e.g. fisheye) of the cameras. Some of the cameras 129 of the sensing system 120 can be video cameras configured to capture a continuous (or quasi-continuous) stream of images of the driving environment 110. The sensing system 120 can also include one or more sonars 128, which can be ultrasonic sonars, in some implementations.

The sensing data obtained by the sensing system 120 can be processed by a data processing system 130 of AV 100. For example, the data processing system 130 can include a perception system 132. The perception system 132 can be configured to detect and/or track objects in the driving environment 110 and to recognize the objects. For example, the perception system 132 can analyze images captured by the cameras 129 and can be capable of detecting traffic light signals, road signs, roadway layouts (e.g., boundaries of traffic lanes, topologies of intersections, designations of parking places, and so on), presence of obstacles, and the like. The perception system 132 can further receive the lidar sensing data (coherent Doppler data and incoherent ToF data) to determine distances to various objects in the environment 110 and velocities (radial and, in some implementations, transverse, as described below) of such objects. In some implementations, the perception system 132 can use the lidar data in combination with the data captured by the camera(s) 129. In one example, the camera(s) 129 can detect an image of a scene, such as a construction zone scene. Using the data from the camera(s) 129, lidar data, etc., the perception system 132 can be capable of determining the existence of objects within the scene (e.g., cones). For example, the perception system 132 can include a scene recognition component 133. The scene recognition component 133 can receive data from the sensing system 120, and can identify a scene (e.g., a construction zone scene) based on the data.

The perception system 132 can further receive information from a GPS transceiver (not shown) configured to obtain information about the position of the AV relative to Earth. The GPS data processing module 134 can use the GPS data in conjunction with the sensing data to help accurately determine location of the AV with respect to fixed objects of the driving environment 110, such as roadways, lane boundaries, intersections, sidewalks, crosswalks, road signs, surrounding buildings, and so on, locations of which can be provided by map information 135. In some implementations, the data processing system 130 can receive non-electromagnetic data, such as sonar data (e.g., ultrasonic sensor data), temperature sensor data, pressure sensor data, meteorological data (e.g., wind speed and direction, precipitation data), and the like.

The data processing system 130 can further include an environment monitoring and prediction component 136, which can monitor how the driving environment 110 evolves with time, e.g., by keeping track of the locations and velocities of the animated objects (relative to Earth). In some implementations, the environment monitoring and prediction component 136 can keep track of the changing appearance of the environment due to motion of the AV relative to the environment. In some implementations, the environment monitoring and prediction component 136 can make predictions about how various animated objects of the driving environment 110 will be positioned within a prediction time horizon. The predictions can be based on the current locations and velocities of the animated objects as well as on the tracked dynamics of the animated objects during a certain (e.g., predetermined) period of time. For example, based on stored data for object 1 indicating accelerated motion of object 1 during the previous 3-second period of time, the environment monitoring and prediction component 136 can conclude that object 1 is resuming its motion from a stop sign or a red traffic light signal. Accordingly, the environment monitoring and prediction component 136 can predict, given the layout of the roadway and presence of other vehicles, where object 1 is likely to be within the next 3 or 5 seconds of motion. As another example, based on stored data for object 2 indicating decelerated motion of object 2 during the previous 2-second period of time, the environment monitoring and prediction component 136 can conclude that object 2 is stopping at a stop sign or at a red traffic light signal. Accordingly, the environment monitoring and prediction component 136 can predict where object 2 is likely to be within the next 1 or 3 seconds. The environment monitoring and prediction component 136 can perform periodic checks of the accuracy of its predictions and modify the predictions based on new data obtained from the sensing system 120.

The data generated by the perception system 132, the GPS data processing module 134, and the environment monitoring and prediction component 136, and a synthetic scene data trained model 142, can be received by an autonomous driving system, such as AV control system (AVCS) 140. The AVCS 140 can include one or more algorithms that control how the AV is to behave in various driving situations and environments. The synthetic scene data trained model 142 is a model trained using synthetic data. For example, the synthetic data can include synthetic scenes (e.g., synthetic construction zone scenes) generated by a synthetic data generator, as will be described in further detail herein. For example, the synthetic data generator can be implemented on an offboard system. As another example, the synthetic data generator can be implemented as part of the perception system 132.

For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (cones, rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as the powertrain and steering 150, vehicle electronics 160, signaling 170, and other systems and components not explicitly shown in FIG. 1. The powertrain and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain and steering 150 (or signaling 170) whereas other instructions output by the AVCS 140 are first delivered to the vehicle electronics 160, which generate commands to the powertrain and steering 150 and/or signaling 170.

In one example, the AVCS 140 can determine that an obstacle identified by the data processing system 130 is to be avoided by decelerating the vehicle until a safe speed is reached, followed by steering the vehicle around the obstacle. The AVCS 140 can output instructions to the powertrain and steering 150 (directly or via the vehicle electronics 160) to 1) reduce, by modifying the throttle settings, a flow of fuel to the engine to decrease the engine rpm, 2) downshift, via an automatic transmission, the drivetrain into a lower gear, 3) engage a brake unit to reduce (while acting in concert with the engine and the transmission) the vehicle's speed until a safe speed is reached, and 4) perform, using a power steering mechanism, a steering maneuver until the obstacle is safely bypassed. Subsequently, the AVCS 140 can output instructions to the powertrain and steering 150 to resume the previous speed settings of the vehicle.

Figure 2:
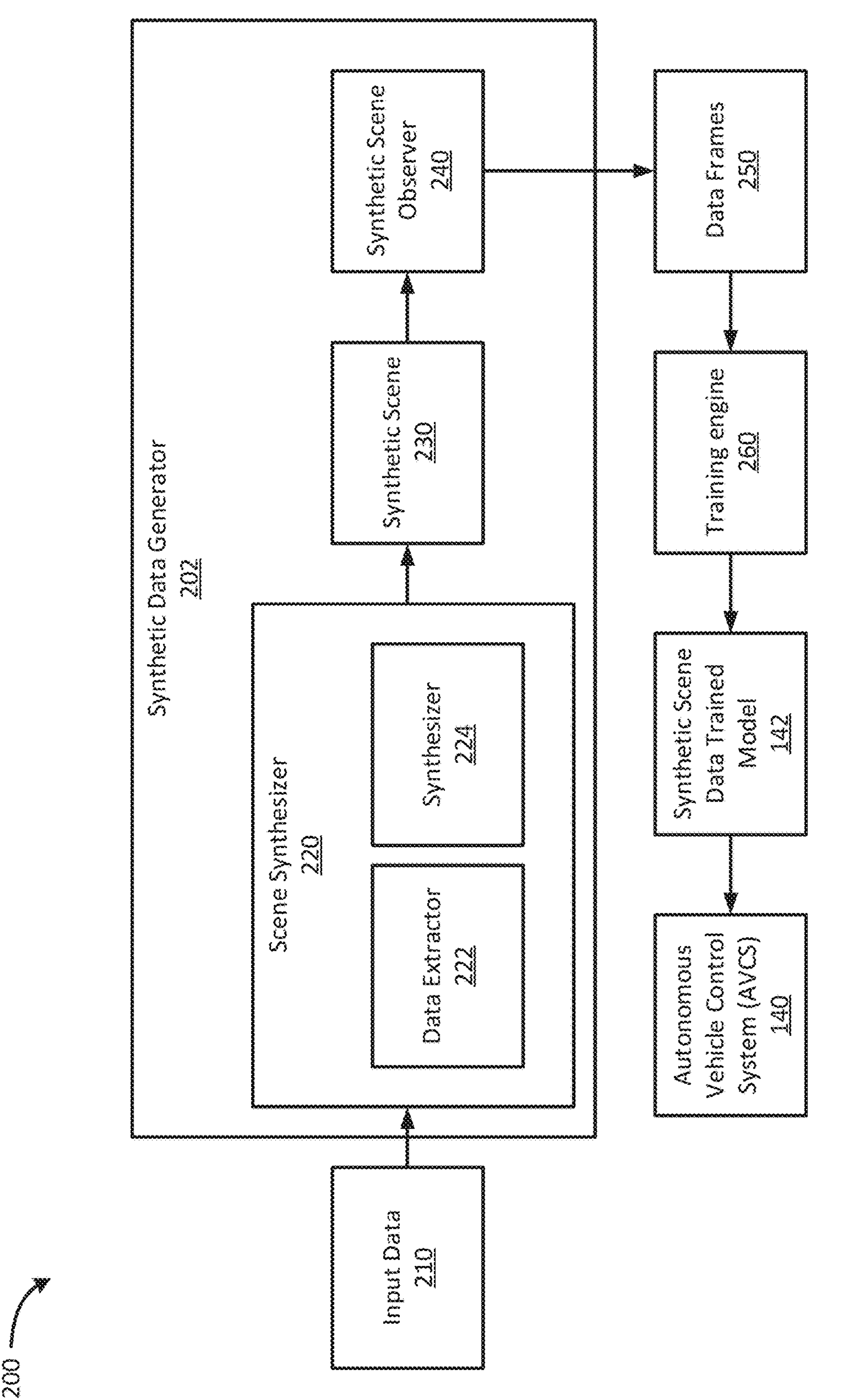
FIG. 2 is a diagram illustrating an example system for generating and utilizing synthetic scenes, in accordance with some implementations of the present disclosure.

FIG. 2 is a diagram illustrating a system 200 for generating and utilizing synthetic scenes, in accordance with some implementations of the present disclosure. In some implementations, the system 200 can be included within an offboard system that is physically separate from an autonomous vehicle (AV) (e.g., offboard server). In some implementations, the system 200 can be included within an onboard perception system of the AV. As shown, input data 210 is received by a scene synthesizer 220 of a synthetic data generator 202. The input data 210 can include one or more messages of real run segments without scenes. A real run segment refers to a segment of the road that are actually driven and imaged (e.g., by cameras and/or lidars). For example, the one or more messages can include one or more communications (comms) messages (e.g., based on the images taken by cameras and/or lidars).

The scene synthesizer 220 analyzes the input data 210 to automatically generate a synthetic scene. In some implementations, the synthetic scene includes a synthetic construction zone. For example, the scene synthesizer 220 can include a data extractor 222 and a synthesizer 224.

The data extractor 222 can then extract data of interest from the input data 210 to obtain extracted data. For example, the extracted data can include an original roadgraph including a set of paths, an AV trajectory, etc. Extracting the data of interest can include receiving a set of messages of a run segment, selecting one or more messages of the set of messages to obtain one or more messages of interest with respect to scene synthesis, and organizing the one or more messages of interest into a set of synchronized frames.

For example, the set of messages can be received as a temporally ordered list (e.g., by timestamp), and selecting the one or more messages can include analyzing the set of messages in temporal order. Each message of interest can have a corresponding type (e.g., pose, localize pose, perception objects, sensor field-of-view, marker detection results), and each synchronized frame can include every type of message of interest, with one message of interest for each type. The timestamps of messages of interest within one synchronized frame can be sufficiently close such that it is reasonable to treat those messages of interest as having occurred simultaneously.

The extracted data can then be used by the synthesizer 224 to generate a synthetic scene 230. For example, the synchronized frames can be received by the synthesizer 224 to generate the synthetic scene 230. Use cases include (1) extracting autonomous vehicle trajectories for constraining the location of a synthetic construction zone; (2) determining a piece of the original roadgraph on which the synthetic scene 230 is generated; and (3) providing useful information for synthetic scene generation (e.g., moving/parked vehicles, sensor field-of-view).

To generate the synthetic scene 230, the synthesizer 224 can automatically generate ground-truth annotations (e.g., lane annotations and boundary annotations) for the synthetic scene 230 based on the original roadgraph. The ground-truth annotations should correspond to a sufficiently smooth and reasonable lane geometry that avoids scene artifacts or objects. In some implementations, the ground-truth annotations can include ground-truth labels. For example, in the case that the synthetic scene 230 is a synthetic construction zone, ground-truth labels can point out the possible paths for driving through the construction zone scene, and should have a sufficiently smooth and reasonable geometry so as it not run into construction zone artifacts (e.g., cones, construction vehicles, construction signs).

To generate the ground-truth annotations, a modified roadgraph can be obtained by modifying the original roadgraph in a manner reflecting a possible real scene (e.g., real construction zone scenario). For example, the original roadgraph can be modified by shifting a path and/or merging a path to a neighboring path. That is, the original roadgraph represents an original layout of driving paths without any indication of a construction zone, and the modified roadgraph represents a changed layout of driving paths (based on the original layout) reflecting a construction zone to be defined within the synthetic scene 230 (e.g., when traffic needs to be directed to a different path due to construction). Accordingly, the modified roadgraph represents the ground-truth lanes of the synthetic scene 230).

Then, the synthesizer 224 can place one or more synthetic artifacts into the modified roadgraph to generate the synthetic scene 230. For example, if the modified roadgraph includes a shifted path, a set of cones defining a boundary of the construction zone can be set along the boundary of the shifted path. The synthetic scene 230 can reside in any suitable coordinate system in accordance with the implementations described herein. For example, the synthetic scene 230 can reside in a latitude-longitude-altitude (lat-lng-alt) coordinate system. A high-level overview of a process of converting a roadgraph to a modified roadgraph including synthetic artifacts using the synthesizer 224 will now be described below with reference to FIG. 3.

Figure 3:
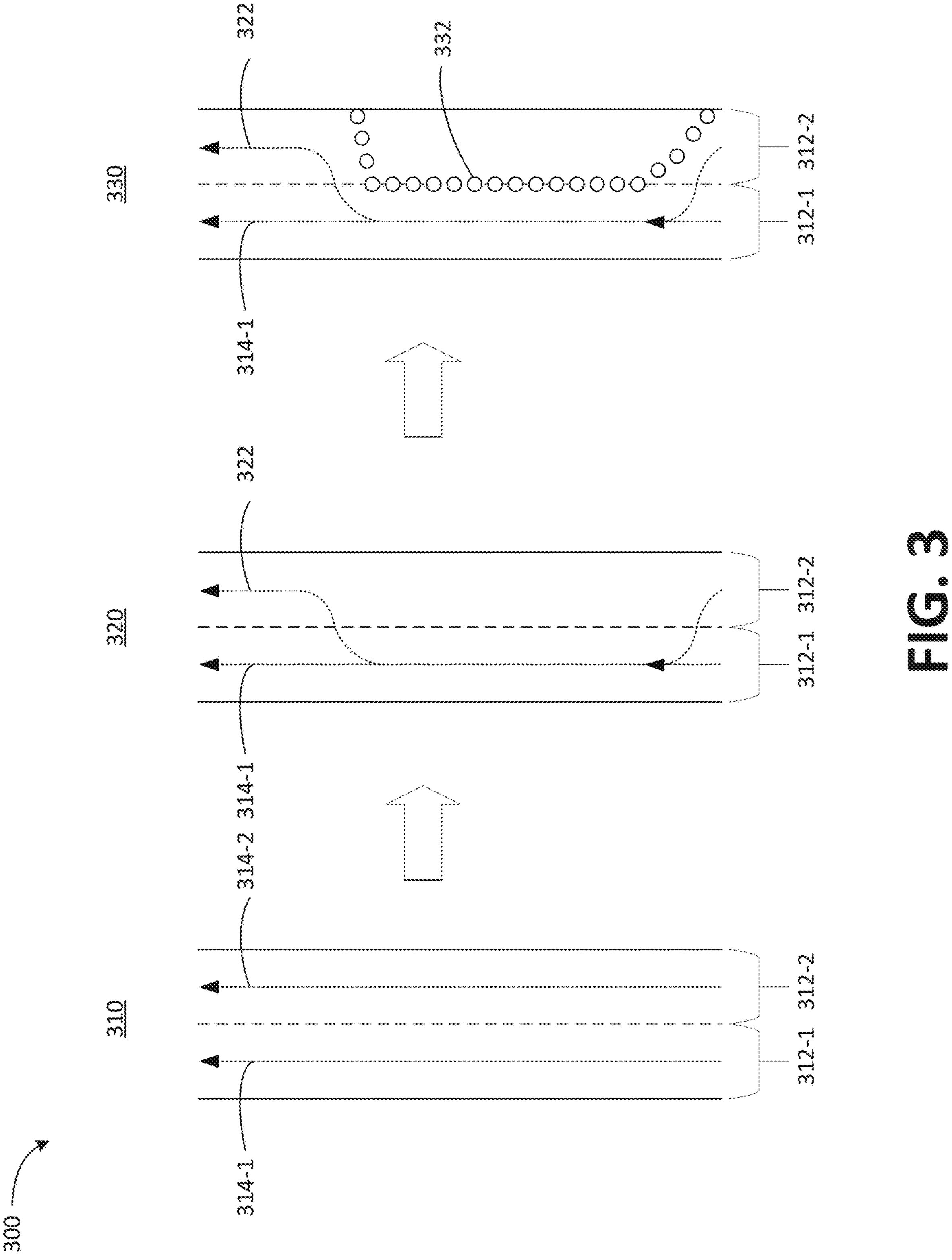
FIG. 3 is a diagram illustrating the conversion of a roadgraph to a modified roadgraph including synthetic objects, in accordance with some implementations of the present disclosure.

FIG. 3 depicts a diagram 300 illustrating the conversion of an original roadgraph to a modified roadgraph including synthetic objects, in accordance with some implementations of the present disclosure. In this illustrative example, the diagram 300 reflects a synthetic construction zone scene. However, such an implementation should not be considered limiting.

As shown, the diagram 300 depicts an original roadgraph 310 having a first roadgraph lane 312-1 and a second roadgraph lane 312-2. A first roadgraph path 314-1 associated with a path of an AV driving within the first roadgraph lane 312-1 and a second roadgraph path 314-2 associated with a path of an AV driving within the second roadgraph lane 312-2 are shown. For purposes of this illustrative example, the roadgraph paths 314-1 and 314-2 are proceeding in the same direction to simulate that traffic should be moving in the same direction within each of the roadgraph lanes 312-1 and 312-2. However, in other implementations, one of the roadgraph paths 314-1 or 314-2 can proceed in an opposite direction to simulate traffic moving in opposite directions.

The diagram 300 further depicts a modified roadgraph 320 modified based on the original roadgraph 310 (e.g., when traffics needs to be directed on a different path due to construction). In this illustrative example, to simulate how a path change can occur to simulate a synthetic construction zone, the corresponding portion of the roadgraph path 314-2 from the original roadgraph 310 is shifted and merged into the roadgraph path 314-1 to generate a modified second path 322. That is, the modified second path 322 is generated before the boundary of the synthetic construction zone is defined by added artifacts/objects.

The diagram 300 further depicts a modified roadgraph with synthetic objects 330. A number of synthetic objects 332 have been placed to define the synthetic construction zone after the modified second path 322 is generated. For example, the synthetic objects 332 can represent a number of cones placed along the boundary of the synthetic construction zone.

The original roadgraph itself may not be designed to be modifiable. In order to modify the original roadgraph, the original roadgraph can be represented by a mutable version of the original roadgraph, or mutable roadgraph. A mutable roadgraph is a data structure that, at a high level, represents a graph of paths. New paths can be attached to spots on the existing graph, existing paths could be disabled, etc. A building block of a mutable roadgraph is referred to an abstract path. A abstract path is a data structure that defines a one-dimensional (1D) space, and stores properties of a synthetic construction zone at various locations of the roadgraph (e.g., using offsets from any suitable reference location). Examples of such properties include, but are not limited to, path center location, path heading, distance to left/right boundaries, speed limit, drivability, etc. The abstract path data structure can have a number of derived classes. One derived class is referred to as "roadgraph path" and represents unchanged roadgraph paths in the original roadgraph. Path properties can be derived from the original roadgraph. Another derived class is referred to as "synthetic path" and represents modified paths during the scene synthesis process. Synthetic path properties can be specified during path creation. An example of a mutable roadgraph will now be described below with reference to FIG. 4.

Figure 4:
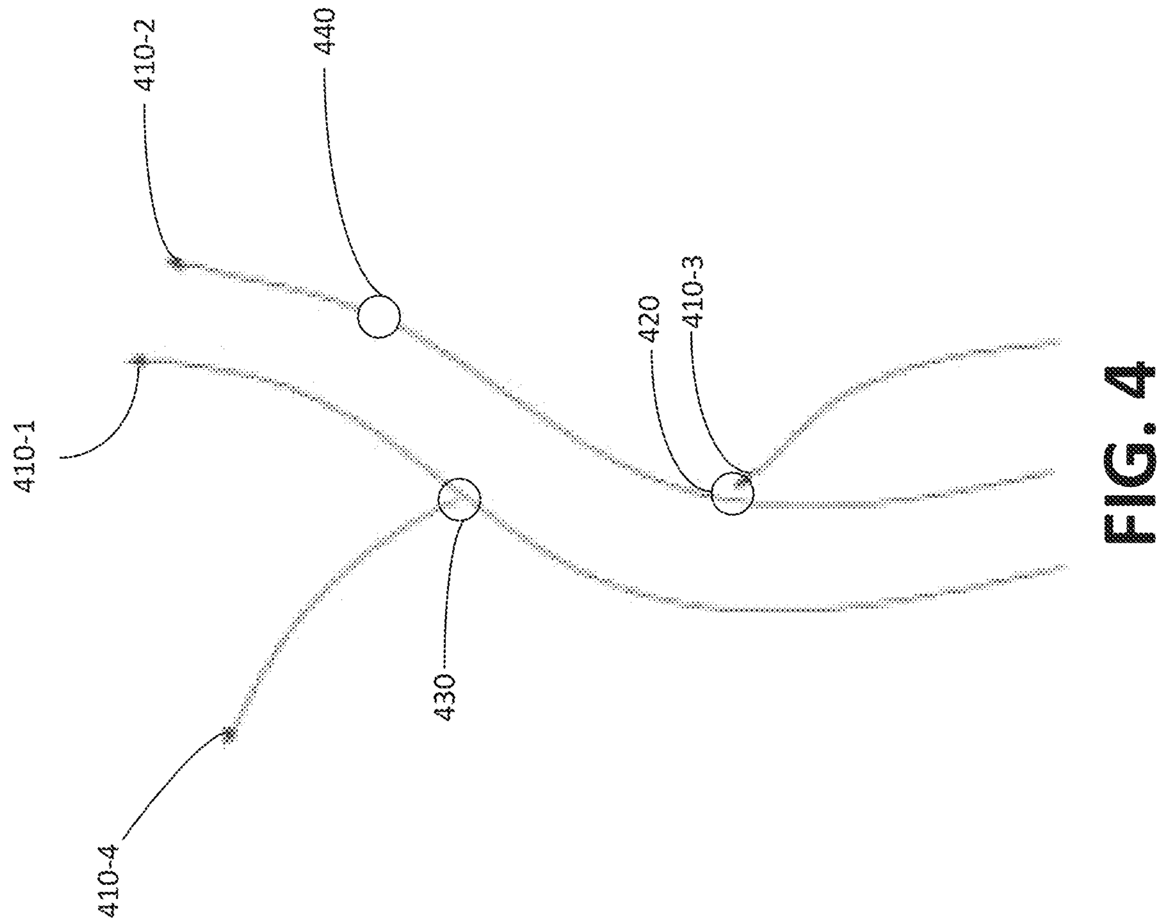
FIG. 4 illustrates an example mutable roadgraph, in accordance with some implementations of the present disclosure.
Figure 4:

FIG. 4 depicts an example mutable roadgraph 400, in accordance with some implementations of the present disclosure. As shown, the mutable roadgraph 400 includes a number of abstract paths 410-1 through 410-4. Abstract path 410-3 is a path associated with an entrance 420, and abstract path 410-4 is a path associated with an exit 430. The entrance 420 and exit 430 can include properties such as, e.g., distance from the beginning of the corresponding synthetic path. For example, the entrance 420 can be at about +50 meters from the beginning of abstract path 410-1, and the exit 430 can be at about +100 meters from the beginning of abstract path 410-2. Properties can be obtained by querying the synthetic path data structure using an offset from a particular reference location. As shown, a query 440 for properties at a point along the abstract path 410-2 is indicated by the circle (e.g., at a given offset from the beginning of the abstract path 410-2).

Abstract paths can be connected with path connection nodes. Such a structure makes it simple to attach new paths at any location along existing paths, which can improve mutable roadgraph flexibility and can make it easier to keep track of the mutable roadgraph structure. A set of modification operations can be supported, which, if properly combined, could simulate change patterns in scenes (e.g., construction zones). An example mutable roadgraph including abstract paths connected with path connection nodes will now be described below with reference to FIG. 5.

Figure 5:
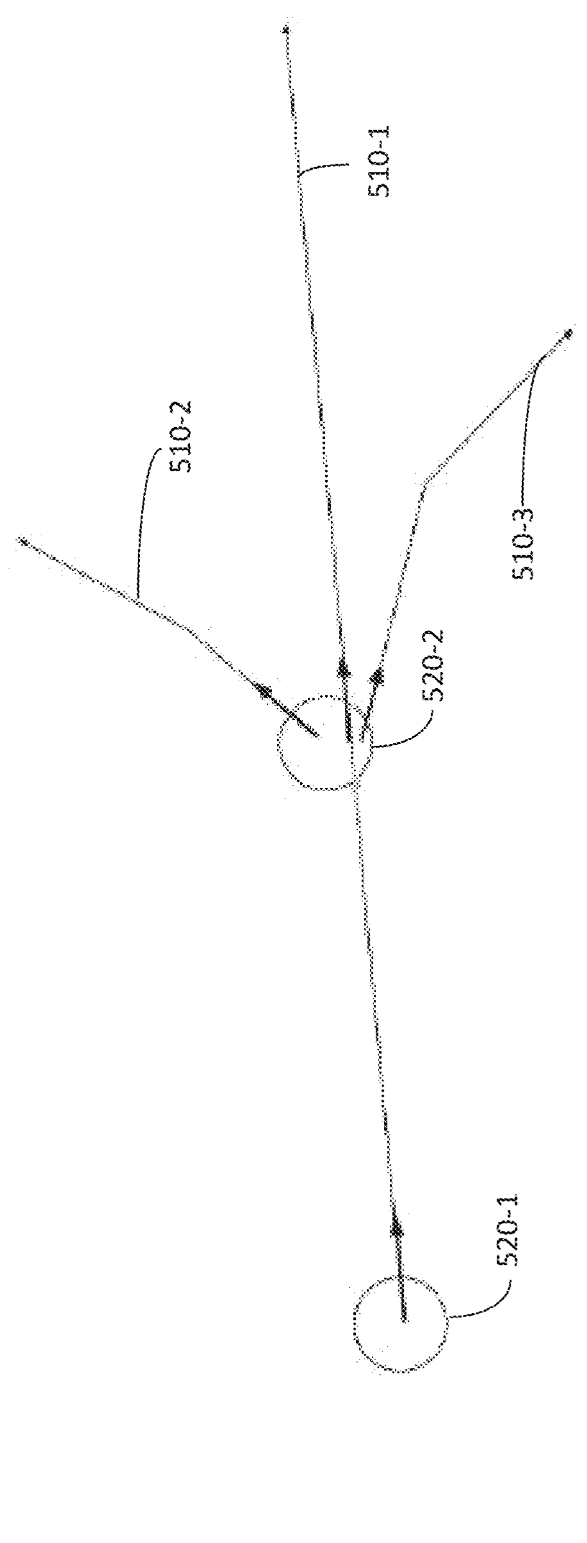
FIG. 5 illustrates an example mutable roadgraph including path connection nodes, in accordance with some implementations of the present disclosure.
Figure 5:

FIG. 5 depicts an example mutable roadgraph 500 including path connection nodes, in accordance with some implementations of the present disclosure. As shown, the mutable roadgraph 500 includes a number of abstract paths 510-1 through 510-3, and a number of path connection nodes ("nodes") 520-1 and 520-2.

The node 520-1 denotes a start point of the abstract path 510-1. By convention, the start point is assigned an offset position of 0.0 m. For example, the start point of the abstract path 510-1 can correspond to an arbitrary start point along the abstract path 510-1. Alternatively, the start point of the abstract path 510-1 can denote a connection to another path (not shown) (e.g., an entrance into the abstract path 510-1).

The node 520-2 denotes a connection of abstract path 510-1 with abstract paths 510-2 and 510-3. For example, the node 520-2 can represent exits from the abstract path 510-1 into the abstract paths 510-2 and 510-3 (e.g., highway exits). To model the connections, the node 520-2 defines end points of the abstract path 510-1 that correspond to respective start points of abstract paths 510-2 and 510-3. For example, the end points of the abstract path 510-1 at node 520-2 can be defined at an offset position from the position of the node 520-1 (e.g., 10.0 m from the node 520-1). Additionally, the start points of the abstract paths 510-2 and 510-3 can be defined at an offset position of 0.0 m from the beginning of node 520-2.

To modify the original roadgraph in a way that is possible in real scenes (e.g., construction zones), path displacement can be performed with operations defined on the mutable roadgraph. For example, after selecting a random path segment, at least the following two operations can be performed: (1) shift the random path segment to the left or to the right by a random distance, which can simulate, e.g., lane shift scenes without topology change and/or (2) merge the random path segment with its neighboring path, which can simulate, e.g., lane closure scenes. In both (1) and (2), the lanes connecting to the path being modified should also be adjusted.

The geometry of the added synthetic paths can be controlled by building paths through pivots. For example, the geometry can be controlled by a curve design toolkit for generating a smooth and continuous curve according to a finite number of control points (optionally with heading and/or curvature constraints at the control points). One example of a curve design toolkit implements clothoids, also referred to as spiros, Cornu spirals, or Euler spirals, which are curves that are characterized by having a curvature proportional to length. Each pivot can specify the path properties at its location (e.g., path center location, heading, curvature, path width, speed limit). The path center curve can be a curve going through all the pivots in a smooth and continuous way, and the path properties along the curve can be interpolated from the pivots. An example of building paths through pivots will now be described below with reference to FIG. 6.

Figure 6:
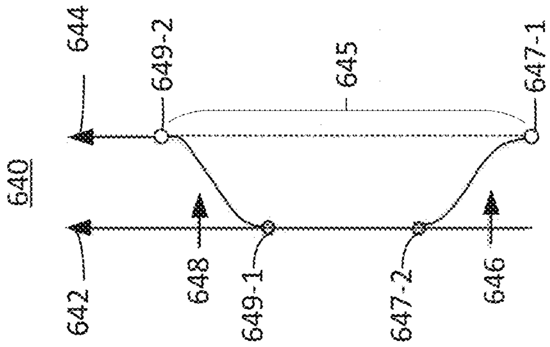
FIG. 6 are diagrams illustrating controlling the geometry of synthetic paths added to a mutable roadgraph, in accordance with some implementations of the present disclosure.
Figure 6:
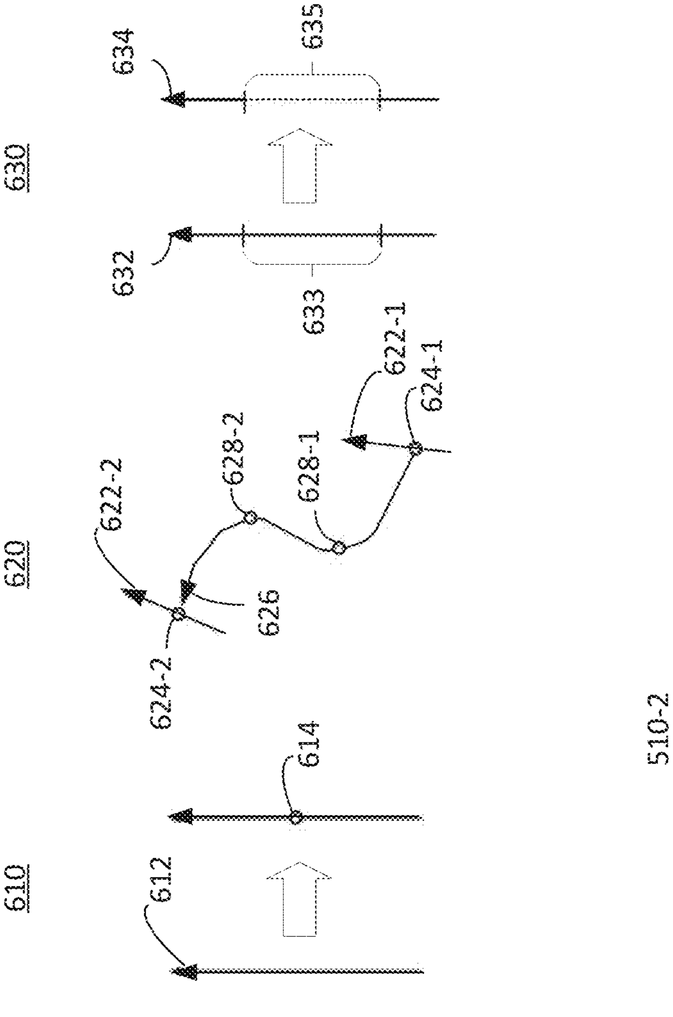

FIG. 6 depicts diagrams 600 illustrating controlling the geometry of synthetic paths added to a mutable roadgraph, in accordance with some implementations of the present disclosure. The diagrams 600 include a build pivot example 610, a build path through pivots example 620, a disabled path interval example 630, and a path closure example 640.

In the build pivot example 610, starting with a synthetic path 612, a pivot 614 is added to the synthetic path 612. Although the pivot 614 is depicted about the center of the synthetic path 612, the pivot 614 can be placed in any suitable location along the synthetic path 612 in accordance with the implementations described herein.

In the build path through pivots example 620, a synthetic path 622-1 having pivot 624-1 and a synthetic path 622-2 having pivot 624-2 are placed at respective positions, where the pivots 624-1 and 624-2 define a start point and an endpoint of a synthetic path 626 having intermediate pivots 628-1 and 628-2.

The disabled path interval example 630 shows the creation of an example disabled path interval. The disabled path interval example 630 shows a synthetic path 632 having an intermediate region 633. Then, the synthetic path 632 is converted into synthetic path 634 having a disabled path interval 635 corresponding to the intermediate region 633. This disabled path interval 635 represents an interval or region of the synthetic path 634 that is disabled due to, e.g., a construction zone.

The path closure example 640 combines what is shown in examples 610-630 in order to show an example of how a mutable roadgraph can be built to reflect a path closure, such as a path closure resulting from a construction zone. The path closure example 640 shows a synthetic path 642 and a synthetic path 644. A disabled path interval 645 is present from the beginning of the synthetic path 644 to some intermediate point within the synthetic path 644. To address the disabled path interval 645 interrupting the synthetic path 644, additional synthetic paths 646 and 648 can be added, which represent path splits and/or merges. The synthetic path 646 can be connected to pivots 647-1 and 647-2, and the synthetic path 648 can be connected to pivots 649-1 and 649-2.

As mentioned above, synthetic objects can be placed along the modified roadgraph to complete a synthetic scene resembling a real scene. The synthetic objects can be represented by their three-dimensional (3D) location. For example, the synthetic objects can include synthetic cones that define the boundaries of a construction zone and/or path detours. The rules for placing synthetic objects on a modified roadgraph to generate a synthetic scene include: (1) place candidate synthetic objects along eligible lane boundaries (e.g., lane boundaries of synthetic paths and/or disabled path intervals representing closed sections of the road); (2) remove candidate synthetic objects that are redundant ("duplicate objects"), which occurred due to random addition of objects; and (3) remove candidate synthetic objects that interfere with drivable paths or traffic ("interfering objects"). In some implementations, removing duplicate objects includes applying non-maximum suppression (NMS) to output filtered synthetic objects from the candidate synthetic objects. NMS generally refers to a class of methods that receive a set or list of candidate object locations as input, and output a set or list of filtered object locations based on whether a distance between any pair of object locations exceeds a threshold distance.

For example, NMS can be applied by pre-defining a threshold distance D, and obtaining a list of candidate object locations. For a location A of the list of candidate object locations, a distance d between A and some location B ahead of A. If d<D, A is removed from the list as it is considered to be sufficiently close in distance to B and is thus the objects corresponding to A and B are determined to be duplicate objects. The process is repeated until the end of the list, and the output is the list of filtered object locations. Further details regarding these synthetic object placement rules will now be described below with reference to FIG. 7.

Figure 7:
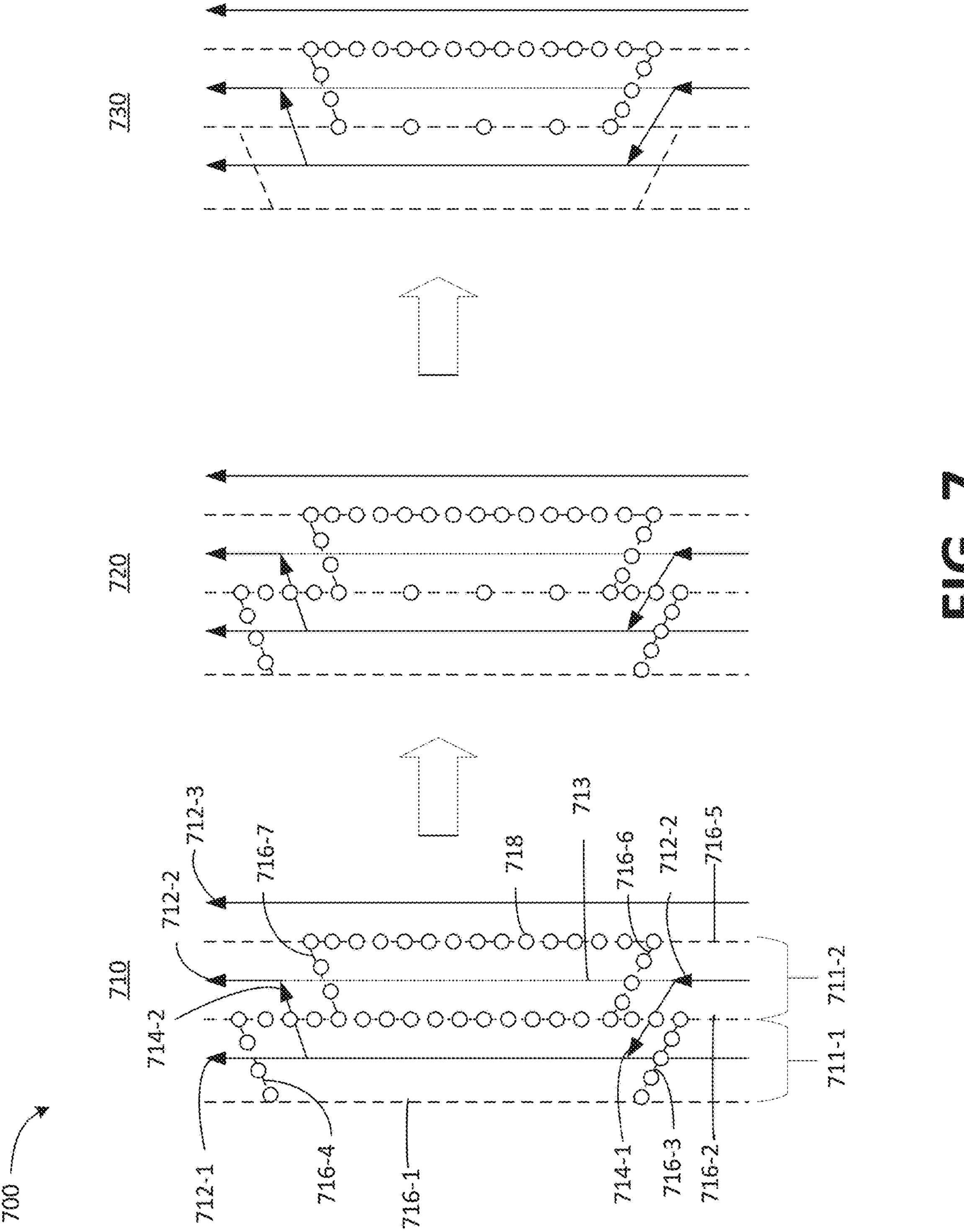
FIG. 7 are diagrams illustrating synthetic object placement on a modified roadgraph, in accordance with some implementations of the present disclosure.

FIG. 7 depicts diagrams 700 illustrating synthetic object placement on a modified roadgraph, in accordance with some implementations of the present disclosure. As shown, the diagrams 700 include a synthetic object placement example 710, a duplicate synthetic object removal example 720, and an interfering synthetic object removal example 730. In this illustrative example, the diagrams 700 are associated with a synthetic construction zone scene in which synthetic construction zone objects are placed. However, such an implementation should not be considered limiting.

The synthetic object placement example 710 shows synthetic lanes 711-1 and 711-2, synthetic paths 712-1 through 712-3. There is a disabled path interval 713 corresponding to synthetic path 712-2. To address this disabled path, additional synthetic paths 714-1 and 714-2 are added to split and/or merge the synthetic lane 712-2 with respect to the synthetic lane 712-1. The synthetic lane 711-1 includes lane boundaries 716-1 through 716-4, and the synthetic lane 711-2 includes lane boundaries 716-2 and 716-5 through 716-7. A number of candidate synthetic objects 718 are placed along at least portions of the lane boundaries 716-1 through 716-7 to represent the synthetic construction zone. For example, the candidate synthetic objects 718 can include cones.

The duplicate synthetic object removal example 720 removes any candidate synthetic objects 718 that are determined to be duplicates. In this example, those of the candidate synthetic objects 718 determined to be duplicates are found on the lane boundary 716-2.

The interfering synthetic object removal example 730 removes any of the remaining candidate synthetic objects 718 that are determined to be interfering with drivable paths or traffic. For example, the candidate synthetic objects 718 that had been placed along 716-3 and 716-4 are removed since the synthetic path 712-1 is not impacted by the construction zone associated with the disabled path interval 713, and the candidate synthetic objects 718 that interfere with the additional synthetic paths 714-1 and 714-2 are removed.

Referring back to FIG. 2, the synthetic scene 230 can then be provided to a synthetic scene observer 240 of the synthetic data generator 202. The synthetic scene observer 240 can observe the synthetic scene 230 by taking a series of "screenshots" of the synthetic scene 230 from a perspective or viewpoint of the AV to generate a set of data frames 250 including one or more object frames. That is, the synthetic scene observer 240 can simulate the perceived processing of a scene by an AV onboard perception system (e.g., perception system 132 of FIG. 1). For example, an observation frame can be generated by converting the synthetic scene 230 into a local perception coordinate frame (e.g., smooth coordinate frame) of the AV for model training. Then, a visibility test for each synthetic artifact can be performed according to, e.g., a sensor field-of-view, or a circle with a predefined radius within which objects are considered visible. Visible objects can be added into the observation frame, while non-visible objects are not included in the observation frame. Optionally, marker observations for painted markers can also be included in the observation frame. Such marker observations can be acquired from onboard modules for painted marker detection, or can be synthesized by converting the lane markers in the roadgraph. The marker observations can be stored in the observation frames as polylines. Observation frames can be generated from multiple viewpoints, including top-down view, perspective view, etc.

To generate the set of data frames 250, the synthetic scene observer 240 can receive additional input data. The additional input data can include streaming AV poses and streaming perception field-of-view. The synthetic scene observer 240 can handle a variety of aspects, including pose divergence, synthetic object visibility and synthetic data format.

Pose refers to a definition of the location of the AV. For example, pose can include one or more of coordinates, roll, pitch, yaw, latitude, longitude, altitude, etc. Regarding pose divergence (e.g., due to the location divergence for navigating the synthetic scene not existing in the real log), synthetic scenes (e.g., synthetic construction zones) can be split into two categories: synthetic scenes that affect the AV's proceeding and synthetic scenes that do not affect the AV's proceeding. By being synthetic, the synthetic scenes do not really exist in the real log. Thus, the AV's pose may need to be modified, which introduces pose divergence. In general, a limited amount of pose divergence can be acceptable (e.g., within about 5 meters). Too large of a pose divergence can make perception unrealistic.

Regarding synthetic object visibility, to simulate what can be observed from an onboard perception system (e.g., perception system 132 of FIG. 1), the AV's pose and perception field-of-view can be used at a particular timestamp to filter out synthetic objects that are not visible to the AV (e.g., occluded and/or too far away from the AV).

Regarding synthetic data format, at least two forms of data can be generated. For example, one form of data can be used to simulate onboard usage, and another form of data can be used for training and testing machine learning models. For onboard usage, the synthetic cones can be wrapped in the same format as onboard real cones, and published in a similar frequency (e.g., from about 10 Hz to about 15 Hz) as alps_main does. The onboard usage data can be stored in a suitable format (e.g., a .clf log format).

The set of data frames 250 can be used to generate a set of target output data for model training. For example, the set of target output data generated based on the set of data frames 250 can include messages (e.g., comms messages) with injected markers and/or perception objects, tensorflow examples, etc.

The set of data frames 250 and the set of target output data can then be provided to a training engine 260 to train a machine learning model, such as the synthetic scene data trained model 142, used to navigate the AV. For example, the machine learning model can be trained to learn how to react to a particular scene (e.g., construction zone) encountered while the AV is in operation. The synthetic scene data trained model 142 can then be used by the AVCS 140 to control how the AV is to behave in various driving situations and environments.

Figures 8, 9:
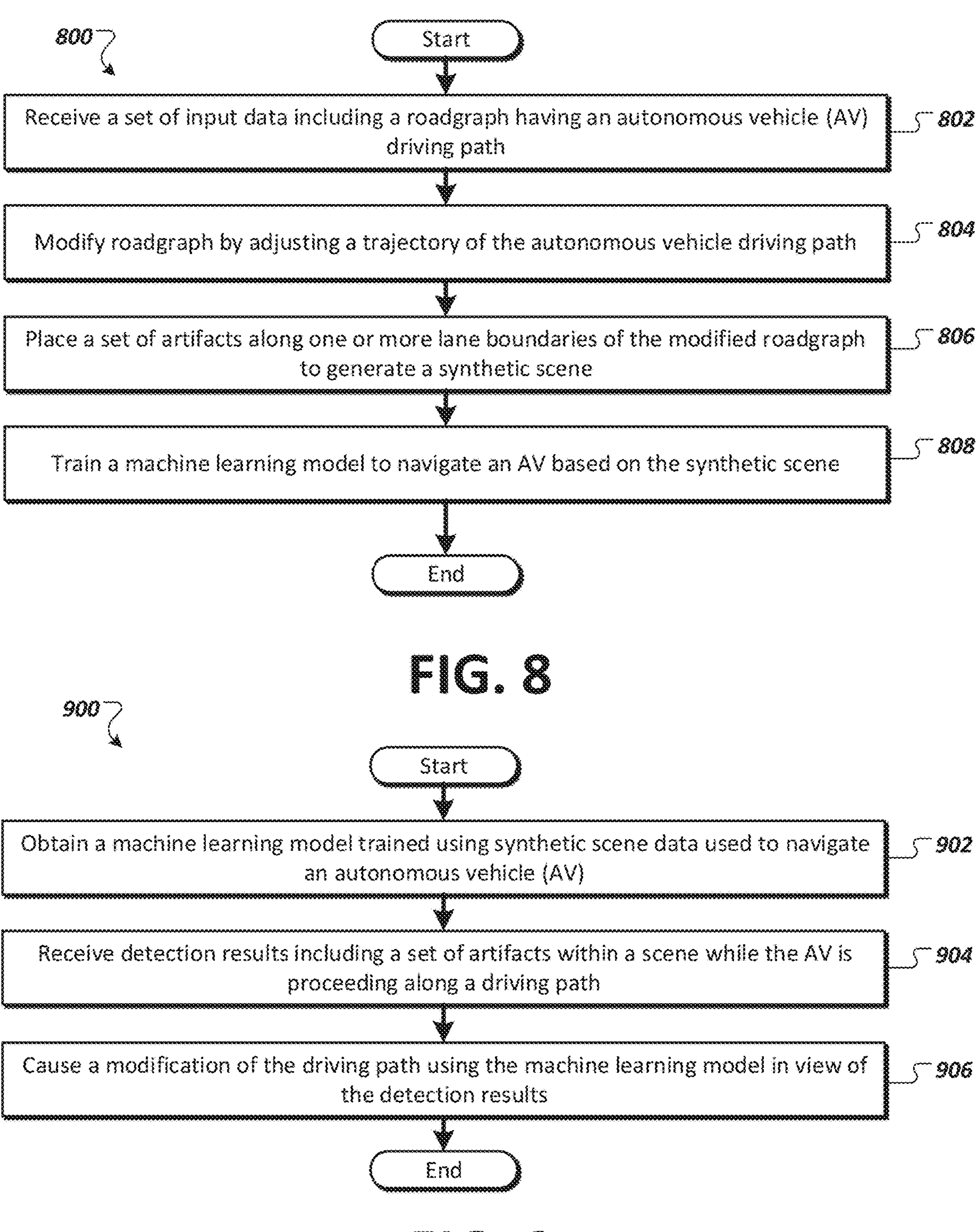
FIG. 8 is a flow diagram of an example method of training a machine learning model for an autonomous vehicle (AV) using synthetic scenes, in accordance with some implementations of the present disclosure.
FIG. 9 is a flow diagram of an example method of using a trained machine learning model to enable control of an autonomous vehicle (AV), in accordance with some implementations of the present disclosure.

FIG. 8 is a flow diagram of an example method 800 of training a machine learning model for an autonomous vehicle (AV) using synthetic scenes, in accordance with some implementations of the present disclosure. The method 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. For example, the processing logic can be included within an offboard system. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 802, the processing logic receives a set of input data including a roadgraph having an autonomous vehicle (AV) driving path. The roadgraph can be a mutable roadgraph, and the AV driving path can be a synthetic path. In some implementations, the synthetic path corresponds to a data structure representing a one-dimensional space having a set of properties to be queried. For example, the set of properties can include at least one of: path center location, path heading, distance to left/right boundaries, speed limit, and drivability. The set of input data can further include a message of real run segments without scenes.

At operation 804, the processing logic modifies the roadgraph by adjusting a trajectory of the AV driving path. Adjusting the trajectory of the AV driving path generates a modified AV driving path. For example, adjusting the trajectory of the AV driving path can include a path shift and/or a path merge into another AV driving path of the modified roadgraph.

At operation 806, the processing logic places a set of artifacts along one or more lane boundaries of the modified roadgraph to generate a synthetic scene. The set of artifacts can include a set of synthetic artifacts or objects used to represent ground-truth lane annotations (e.g., labels) of the synthetic scene reflective of the modified synthetic path. In some implementations, the synthetic scene is a synthetic construction zone, and the synthetic objects include synthetic cones. An example method for placing a set of artifacts along one or more lane boundaries of the modified roadgraph to generate a synthetic scene is described below with reference to FIG. 10.

At operation 808, the processing logic trains a machine learning model to navigate an AV based on the synthetic scene. The machine learning model can be a synthetic data trained model. In some implementations, training the machine learning model includes generating a set of training input data including a set of data frames from the synthetic scene, obtaining, a set of target output data (e.g., ground-truth annotations or labels) for the set of training input data, and training the machine learning model based on the set of training input data and the set of target output data. The set of target output data can include at least one of messages with injected markers and/or perception objects, or tensorflow examples.

In particular, the machine learning model can be used by the AV (e.g., AVCS of the AV) to recognize a real-life scene, such as a construction zone, and control the AV based on the real-life scene. For example, the AV can modify its course along a path in accordance with the real-life scene. Illustratively, if the scene is a construction zone, the AV can modify its course to follow a detour (e.g., lane split and/or merge) by recognizing construction zone objects that demarcate the detour (e.g., cones). Further details regarding operations 802-812 are described above with reference to FIGS. 1-7.

FIG. 9 is a flow diagram of an example method 900 of using a trained machine learning model to enable control of an autonomous vehicle (AV), in accordance with some implementations of the present disclosure. The method 900 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. For example, the processing logic can be included within the control system of the AV (e.g., AVCS 140). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 902, the processing logic obtains a machine learning model trained using synthetic data used to navigate an autonomous vehicle (AV). For example, the machine learning model can be used by an AV control system to control the AV. The trained machine learning model can be the machine learning model trained in the manner described above with reference to FIGS. 1-8.

At operation 904, the processing logic receives detection results including a set of artifacts within a scene while the AV is proceeding along a driving path. For example, the detection results can be received from upstream modules of the AV. In some implementations, the set of artifacts can designate lane closures and/or lane modifications that require the AV to take a detour. For example, if the scene is a construction zone scene, the set of artifacts can include a set of construction zone artifacts (e.g. cones) that are used to direct vehicles around a construction zone.

At operation 906, the processing logic causes a modification of the driving path using the machine learning model in view of the detection results. For example, the processing logic can determine a detour with respect to the driving path (e.g., a lane path and/or shift) in view of the set of artifacts identified within the scene, and can cause the AV to adjust its route in accordance with the detour.

Figure 10:
FIG. 10 is a flow diagram of an example method of placing a set of artifacts along one or more lane boundaries of a modified roadgraph to generate a synthetic scene, in accordance with some implementations of the present disclosure.
Figure 10:
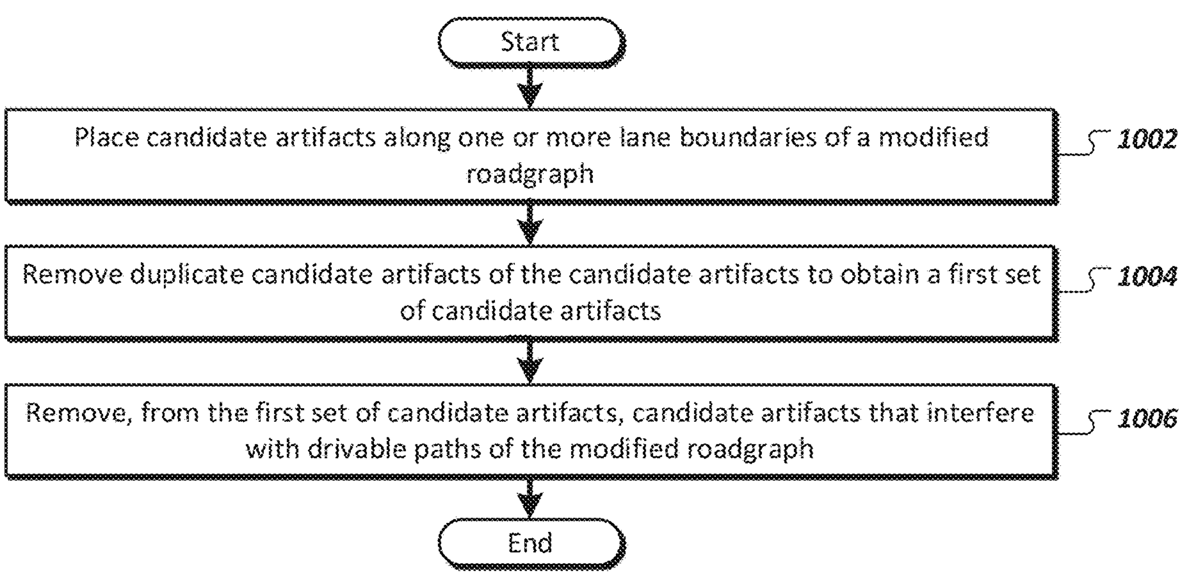

FIG. 10 is a flow diagram of an example method 1000 of placing a set of artifacts along one or more lane boundaries of a modified roadgraph to generate a synthetic scene, in accordance with some implementations of the present disclosure. For example, the method 1000 can be performed as part of operation 806 of the method 800 described above with reference to FIG. 8. The method 1000 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. For example, the processing logic can be included within the control system of the AV (e.g., AVCS 140). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 1002, the processing logic places candidate artifacts along one or more lane boundaries of a modified roadgraph. At operation 1004, the processing logic removes duplicate candidate artifacts of the candidate artifacts to obtain a first set of candidate artifacts. At operation 1006, the processing logic removes, from the first set of candidate artifacts, interfering candidate artifacts. Interfering candidate artifacts include artifacts of the first set of candidate artifacts that interfere with drivable paths of the modified roadgraph, or traffic. The duplicate candidate artifacts can be removed by applying non-maximum suppression (NMS) to output filtered synthetic objects from the candidate synthetic objects. Further details regarding FIG. 10 are described above with reference to FIGS. 6-8.

Figure 11:
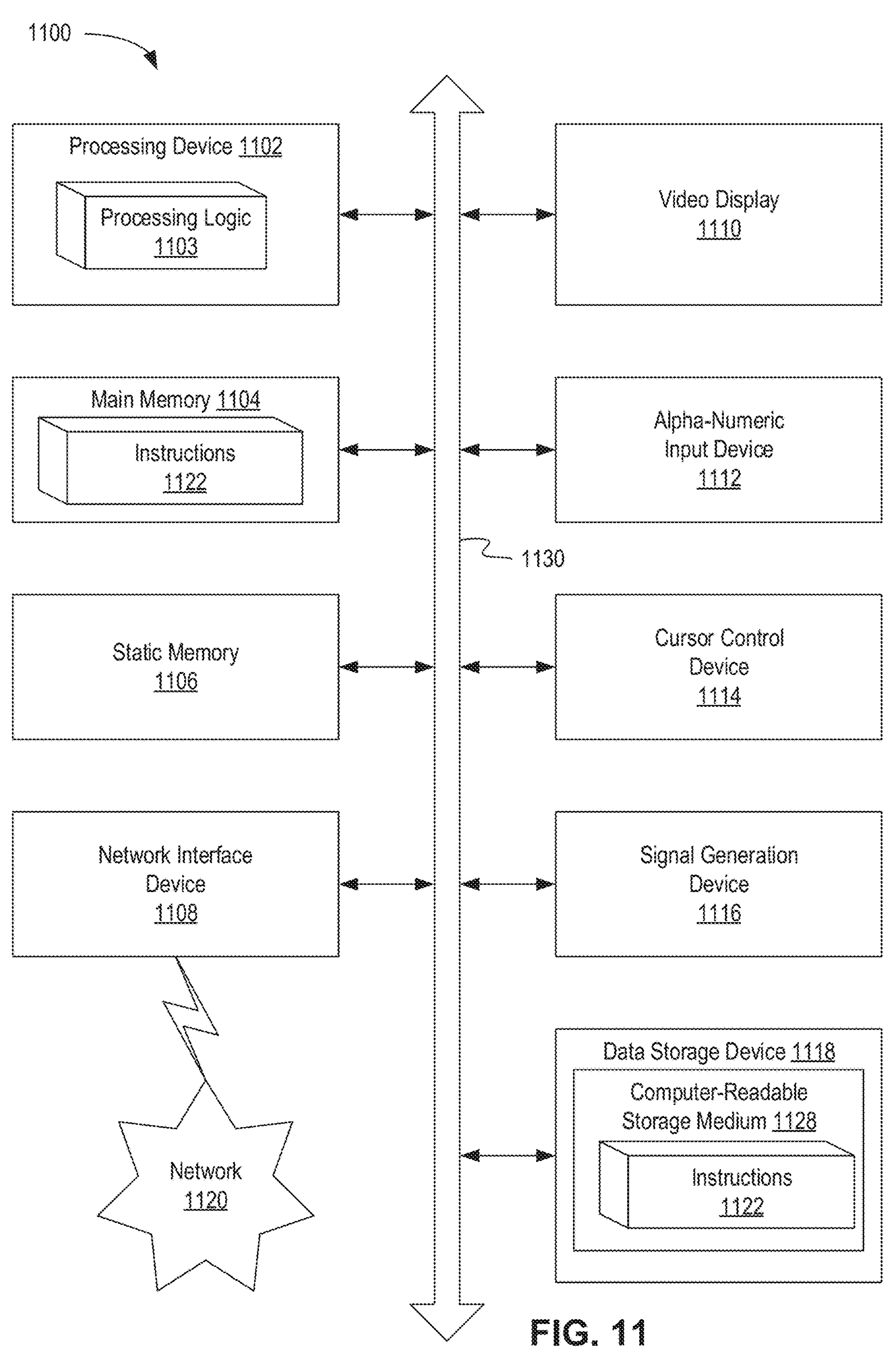
FIG. 11 is a block diagram of an example computer device within which a set of instructions, for causing the machine to perform any of the one or more methodologies discussed herein can be executed, in accordance with some implementations of the disclosure.

FIG. 11 depicts a block diagram of an example computer device 1100 within which a set of instructions, for causing the machine to perform any of the one or more methodologies discussed herein can be executed, in accordance with some implementations of the disclosure. Example computer device 1100 can be connected to other computer devices in a LAN, an intranet, an extranet, and/or the Internet. Computer device 1100 can operate in the capacity of a server in a client-server network environment. Computer device 1100 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" includes any collection of computers that individually or jointly execute a set (or multiple sets) of instructions to perform any one or more of the methods discussed herein. In some implementations, the computer device 1100 is an offboard AV server. In some implementations, the AV 100 includes the computer device 1100 (e.g., AVCS 140 includes computer device 1100).

The computer device 1100 can include a processing device 1102 (also referred to as a processor or CPU), which can include processing logic 1103, a main memory 1104 (e.g., read-only memory (ROM), flash memory, dynamic random access memory (DRAM) such as synchronous DRAM (SDRAM), etc.), a static memory 1106 (e.g., flash memory, static random access memory (SRAM), etc.), and a secondary memory (e.g., a data storage device 1118), which can communicate with each other via a bus 1130.

Processing device 1102 represents one or more general-purpose processing devices such as a microprocessor, central processing unit, or the like. More particularly, processing device 1102 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1102 can also be one or more special-purpose processing devices such as an application specific integrated circuit (ASIC), a field programmable gate array (FPGA), a digital signal processor (DSP), network processor, or the like. In accordance with one or more aspects of the disclosure, processing device 1102 can be configured to execute instructions performing any of the operations performed by the AV server and/or the AVCS 140.

Example computer device 1100 can further comprise a network interface device 1108, which can be communicatively coupled to a network 1120. Example computer device 1100 can further comprise a video display 1110 (e.g., a liquid crystal display (LCD), a touch screen, or a cathode ray tube (CRT)), an alphanumeric input device 1112 (e.g., a keyboard), a cursor control device 1114 (e.g., a mouse), and an acoustic signal generation device 1116 (e.g., a speaker).

Data storage device 1118 can include a computer-readable storage medium (or, more specifically, a non-transitory computer-readable storage medium) 1128 on which is stored one or more sets of executable instructions 1122. In accordance with one or more aspects of the disclosure, executable instructions 1122 can comprise executable instructions to perform any of the operations of AVCS 140.

Executable instructions 1122 can also reside, completely or at least partially, within main memory 1104 and/or within processing device 1102 during execution thereof by example computer device 1100, main memory 1104 and processing device 1102 also constituting computer-readable storage media. Executable instructions 1122 can further be transmitted or received over a network via network interface device 1108.

While the computer-readable storage medium 1128 is shown in FIG. 11 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" includes any medium that is capable of storing or encoding a set of instructions for execution by the machine that cause the machine to perform any one or more of the methods described herein. The term "computer-readable storage medium" includes, but is not limited to, solid-state memories, and optical and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the disclosure is not described with reference to any particular programming language. It will be appreciated that a variety of programming languages can be used to implement the teachings of the disclosure as described herein.

The disclosure can be provided as a computer program product, or software, that can include a machine-readable medium having stored thereon instructions, which can be used to program a computer system (or other electronic devices) to perform a process according to the disclosure. A machine-readable medium includes any mechanism for storing information in a form readable by a machine (e.g., a computer). In some implementations, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc. The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an embodiment," "one embodiment," "some embodiments," "an implementation," "one implementation," "some implementations," or the like throughout may or may not mean the same embodiment or implementation. One or more embodiments or implementations described herein may be combined in a particular embodiment or implementation. The terms "first," "second," "third," "fourth," etc. as used herein are meant as labels to distinguish among different elements and may not necessarily have an ordinal meaning according to their numerical designation.

In the foregoing specification, implementations of the disclosure have been described with reference to specific example implementations thereof. It will be evident that various modifications can be made thereto without departing from the broader spirit and scope of implementations of the disclosure as set forth in the following claims. The specification and drawings are, accordingly, to be regarded in an illustrative sense rather than a restrictive sense.

What is claimed is:

1. A system for generating and utilizing synthetic scenes, comprising:

a memory device; and a processing device, operatively coupled to the memory device, to:

receive, at the system, a set of input data including a roadgraph, the roadgraph representing drivable paths and object configurations associated with a segment of road driven and imaged by a first autonomous vehicle, and the drivable paths comprising an autonomous vehicle driving path of the first autonomous vehicle, wherein the autonomous vehicle driving path comprises a plurality of path connection nodes disposed on the autonomous vehicle driving path;

modify the roadgraph by adjusting a trajectory of the autonomous vehicle driving path, wherein adjusting the trajectory of the autonomous vehicle driving path comprises:

generating between a first pair of path connection nodes of the plurality of path connection nodes, a first synthetic path segment to address a disabled path interval of a path of the roadgraph, the disabled path interval being bounded by the pair of path connection nodes; and generating between a second pair of path connection nodes of the plurality of path connection nodes, a second synthetic path segment connecting the autonomous vehicle driving path to a neighboring drivable path of the drivable paths;

place a set of artifacts along one or more lane boundaries of the modified roadgraph comprising the first synthetic path segment and the second synthetic path segment to generate a synthetic scene, wherein placing the set of artifacts comprises placing candidate artifacts along one or more lane boundaries of the first synthetic path segment, one or more lane boundaries of the second synthetic path segment, and one or more lane boundaries of the disabled path interval;

train a machine learning model to navigate a second autonomous vehicle based on the synthetic scene; and cause a steering mechanism of the second autonomous vehicle to perform a steering maneuver.

2. The system of claim 1, wherein the synthetic scene is a synthetic construction zone, and wherein the set of artifacts comprises a set of construction zone artifacts.

3. The system of claim 2, wherein the set of construction zone artifacts comprises at least one of: a cone, a road block, a road sign, or a person.

4. The system of claim 1, wherein adjusting the trajectory of the autonomous vehicle driving path further comprises shifting path segments of the autonomous vehicle driving path between pairs of respective path connection nodes of the plurality of path connection nodes, wherein each of the path segments is shifted by a random distance.

5. The system of claim 1, wherein the drivable paths of the roadgraph further comprises at least one of: path center location, path heading, distance to left/right boundaries, speed limit, or an indication of drivability.

6. The system of claim 1, wherein, to place the set of artifacts along the one or more lane boundaries of the modified roadgraph, the processing device is to:

remove duplicate candidate artifacts of the candidate artifacts to obtain a first set of candidate artifacts; and remove, from the first set of candidate artifacts, candidate artifacts that interfere with drivable paths of the modified roadgraph.

7. The system of claim 6, wherein the duplicate candidate artifacts are removed by applying non-maximum suppression.

8. The system of claim 1, wherein the processing device is further to:

generate a set of training input data comprising a set of data frames from the synthetic scene; and obtain a set of target output data for the set of training input data, wherein the machine learning model is trained using the set of training input data and the set of target output data.

9. The system of claim 8, wherein the set of target output data comprises one or more ground-truth annotations related to the synthetic scene for the set of data frames in the set of training data.

10. A method comprising:

receiving, by a processing device of a system for generating and utilizing synthetic scenes, a set of input data including a roadgraph, the roadgraph representing drivable paths and object configurations associated with a segment of road driven and imaged by a first autonomous vehicle, and the drivable paths comprising an autonomous vehicle driving path of the first autonomous vehicle, wherein the autonomous vehicle driving path comprises a plurality of path connection nodes disposed on the autonomous vehicle driving path;

modifying, by the processing device, the roadgraph by adjusting a trajectory of the autonomous vehicle driving path, wherein adjusting the trajectory of the autonomous vehicle driving path comprises:

generating between a first pair of path connection nodes of the plurality of path connection nodes, a first synthetic path segment to address a disabled path interval of a path of the roadgraph, the disabled path interval being bounded by the pair of path connection nodes; and generating between a second pair of path connection nodes of the plurality of path connection nodes, a second synthetic path segment connecting the autonomous vehicle driving path to a neighboring drivable path of the drivable paths;

placing, by the processing device, a set of artifacts along one or more lane boundaries of the modified roadgraph comprising the first synthetic path segment and the second synthetic path segment to generate a synthetic scene, wherein placing the set of artifacts comprises placing candidate artifacts along one or more lane boundaries of the first synthetic path segment, one or more lane boundaries of the second synthetic path segment, and one or more lane boundaries of the disabled path interval;

training, by the processing device, a machine learning model to navigate a second autonomous vehicle based on the synthetic scene; and causing a steering mechanism of the second autonomous vehicle to perform a steering maneuver.

11. The method of claim 10, wherein the synthetic scene is a synthetic construction zone, and wherein the set of artifacts comprises a set of construction zone artifacts.

12. The method of claim 11, wherein the set of construction zone artifacts comprises at least one of: a cone, a road block, a road sign, or a person.

13. The method of claim 10, wherein modifying the roadgraph further comprises merging a second segment of the autonomous vehicle driving path between two of the plurality of path connection nodes with a segment of one of the drivable paths.

14. The method of claim 10, wherein the drivable paths of the roadgraph further comprises at least one of: path center location, path heading, distance to left/right boundaries, speed limit, or an indication of drivability.

15. The method of claim 10, wherein placing the set of artifacts comprises:

removing duplicate candidate artifacts of the candidate artifacts to obtain a first set of candidate artifacts; and removing, from the first set of candidate artifacts, candidate artifacts that interfere with drivable paths of the modified roadgraph.

16. The method of claim 15, wherein removing the duplicate candidate artifacts comprises applying non-maximum suppression.

17. The method of claim 10, further comprising:

generating, by the processing device, a set of training input data comprising a set of data frames from the synthetic scene; and obtaining, by the processing device, a set of target output data for the set of training input data, wherein the machine learning model is trained using the set of training input data and the set of target output data.

18. The method of claim 17, wherein the set of target output data comprises one or more ground-truth annotations related to the synthetic scene for the set of data frames in the set of training data.

19. A method comprising:

obtaining a trained machine learning model used to navigate a first autonomous vehicle, wherein the trained machine learning model is trained at a system for generating and utilizing synthetic scenes and is trained based on a synthetic scene comprising a modified roadgraph modified from an original roadgraph representing drivable paths and object configurations associated with a segment of road driven and imaged by a second autonomous vehicle, the drivable paths comprising an autonomous vehicle driving path of the second autonomous vehicle that comprises a plurality of path connection nodes disposed on the autonomous driving path, the modified roadgraph having a modified autonomous vehicle driving path that comprises a first synthetic path segment generated between a first pair of path connection nodes of the plurality of path connection nodes to address a disabled path interval bounded by the first pair of path connection nodes of a path of the roadgraph, and a second synthetic path segment generated between a second pair of path connection nodes of the plurality of path connection nodes connecting the autonomous vehicle driving path to a neighboring drivable path of the drivable paths, and a set of synthetic artifacts along at least one lane boundary of the modified roadgraph, wherein the set of synthetic artifacts comprises candidate artifacts placed along one or more lane boundaries of the first synthetic path segment, one or more lane boundaries of the second synthetic path segment, and one or more lane boundaries of the disabled path interval;

receiving detection results including a set of artifacts within a scene while the first autonomous vehicle is proceeding along a driving path;

causing a modification of the driving path using the trained machine learning model in view of the detection results; and causing a steering mechanism of the first autonomous vehicle to perform a steering maneuver based on the modified driving path.

20. The method of claim 19, wherein the scene is a construction zone, and wherein the set of artifacts comprises a cone.

* * * * *